United States Patent [19]

Natori et al.

[11] 3,937,004

[45] Feb. 10, 1976

[54] PORTABLE MINIATURE TYPE INFORMATION TREATING DEVICE

[75] Inventors: Minoru Natori, Hidaka; Yasushi Nomura, Tokorozawa; Fukuo Sekiya, Tokorozawa; Shigeru Morokawa, Tokorozawa; Akira Nakai, Tokyo, all of Japan

[73] Assignee: Citizen Watch Co., Ltd., Tokyo, Japan

[22] Filed: May 24, 1974

[21] Appl. No.: 472,958

[30] Foreign Application Priority Data

May 28, 1973 Japan.............................. 48-59593
June 21, 1973 Japan.............................. 48-70066
Nov. 15, 1973 Japan............................ 48-128550

[52] U.S. Cl................ 58/152 B; 325/55; 325/396; 58/50 R; 58/152 A
[51] Int. Cl.²........................................ G04B 47/00
[58] Field of Search.......... 58/23 R, 24 R, 50 R, 16, 58/152 B, 152 A, 19 R, 57.5; 325/55, 361, 396; 340/311

[56] References Cited
UNITED STATES PATENTS

| 3,664,116 | 5/1973 | Emerson et al. | 58/50 RX |
| 3,745,761 | 7/1973 | Tsuruishi | 58/23 RX |
| 3,803,834 | 4/1974 | Reese | 58/50 RX |
| 3,813,533 | 5/1974 | Cone et al. | 58/50 RX |
| 3,816,730 | 6/1974 | Yamamoto et al. | 58/50 RX |
| 3,822,547 | 7/1974 | Fujita | 58/57.5 X |
| 3,834,153 | 9/1974 | Yoda et al. | 58/57.5 X |

OTHER PUBLICATIONS
Ludeman et al., "IBM Technical Disclosure Bulletin," pp. 3350–3351, Vol. 15, No. 11, Apr. 1973.

*Primary Examiner*—George H. Miller, Jr.
*Assistant Examiner*—U. Weldon
*Attorney, Agent, or Firm*—Ernest G. Montague; Karl F. Ross; Herbert Dubno

[57] ABSTRACT

An electronic timepiece, used as a pager watch, has a speaker for emitting an alarm sound at a preset time and also for reproducing an external call signal intercepted by a receiver for incoming electromagnetic waves. The receiver may be maintained normally inactive, being periodically activated for short time intervals under the control of a frequency divider in the output of a crystal oscillator serving to drive an electro-optical display. Sensors responsive to abnormal ambient conditions, e.g. temperature or blood pressure of the wearer, may also operate the speaker.

3 Claims, 1 Drawing Figure

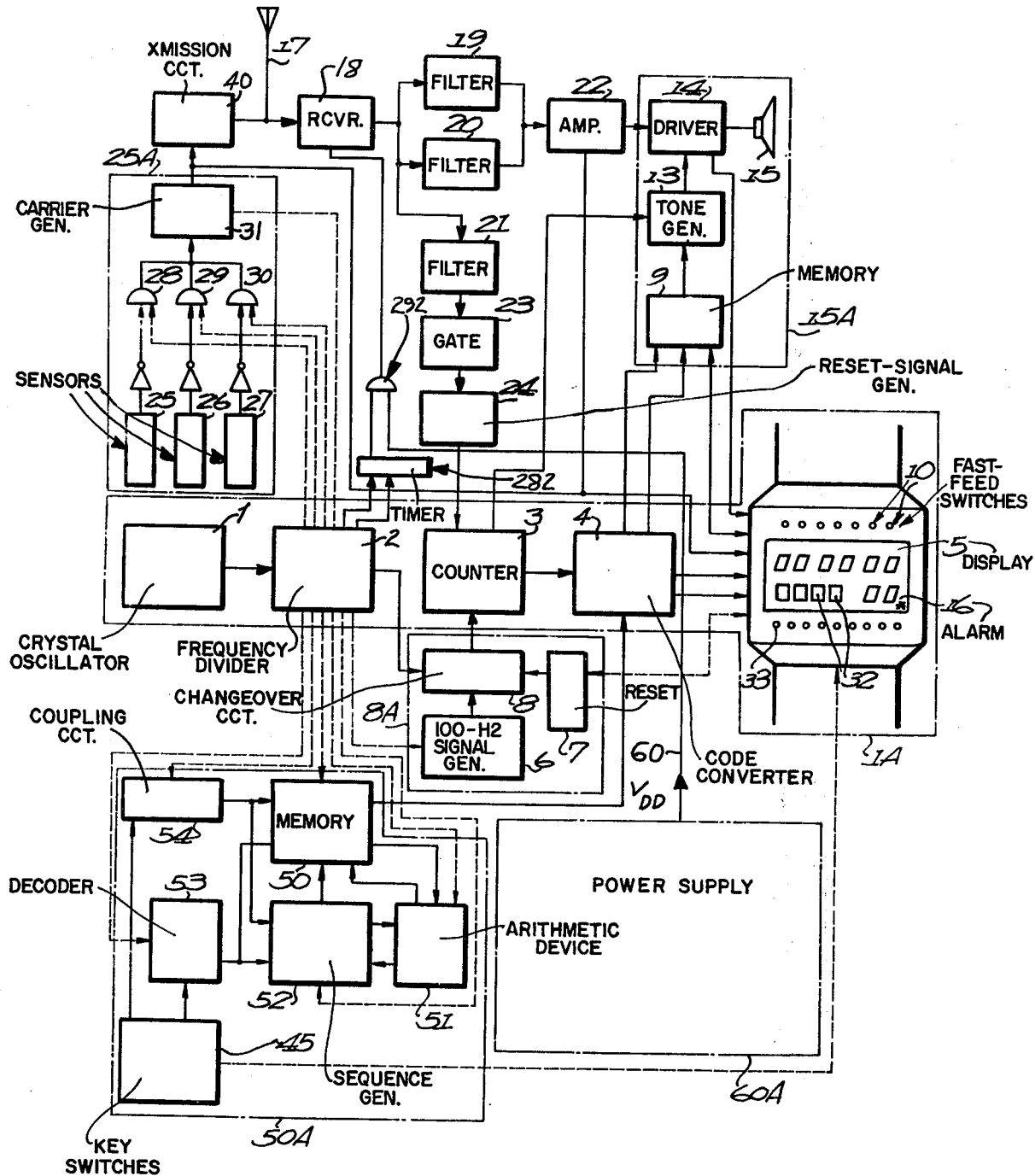

PORTABLE MINIATURE TYPE INFORMATION TREATING DEVICE

Our present invention relates to a so-called pager watch, i.e. to a portable electronic timepiece provided with a receiver for an internal call signal to be acoustically reproduced by a suitable sound emitter.

For the individual paging of a large number of wearers of timepieces such as wristwatches by electromagnetic waves emitted from a central location, different types of call signals may be employed as well as different carrier frequencies therefor. In order to discriminate between diverse call signals, however, relatively complex circuitry is necessary.

The object of our present invention, therefore, is to provide simplified means in a pager-type timepiece for making a receiver thereof selectively responsive to certain call signals to the exclusion of signals designated for the wearers of other timepieces of the same general construction.

This object is realized, in accordance with our present invention, by the provision of normally deactivated receiving means in a timepiece comprising a crystal oscillator which steps a counter through the intermediary of a frequency divider, the counter working into a code converter for generating time-indicating signal for the energization of electro-optical display means such as liquid-crystal segments. A timer controlled by the frequency divider serves for the periodic actuation of the receiving means for a limited time interval; it is only during this time interval that a sound emitter on the timepiece can respond to external call signals to alert the user.

The emitter may also be operated, in a manner known per se, by a manually settable alarm circuit controlled by the counter. That counter may also be resettable by an external signal intercepted by the receiving means.

According to a further feature of our invention, the timepiece may be provided with one or more sensors connected to the sound emitter for operating same upon detecting an abnormal ambient condition, e.g. as to the body temperature or the blood pressure of the wearer.

Our invention will now be described in detail with reference to the accompanying drawing the sole FIGURE of which shows, diagrammatically, an integrated electronic timepiece of the CMOS type designed as a pager watch according to the present improvement.

As shown in the drawing, a pager-type wristwatch embodying our invention comprises an electro-optical unit 1A, a game-timing unit 8A, a sound-emitting unit 15A, a sensing unit 25A, a calculating unit 50A and a power supply 60A. These units may all be incorporated in an integrated-circuit module consuming relatively little electrical energy.

The electro-optical unit 1A comprises a crystal oscillator 1 serving as a timing-pulse generator, this oscillator working into a frequency divider 2 which steps a counter 3 through a changeover circuit 8 included in game-timing unit 8A. A liquid-crystal display 5, driven by the counter 3 through a code converter 4 as is well known per se, comprises the usual array of segmented digital indicators manually controllable by fast-feed switches 10. Unit 1A also has an alarm section 16 with indicating elements 32 and control switches 33 therefor.

Unit 8A further includes a 100-Hz signal generator 6 and a reset circuit 7, the latter being controllable by external switches not shown. Circuits 6 and 7 work into changeover circuit 8 for modifying the time display of unit 1A, in a manner not relevant to our present invention, by loading the counter 3 with information on elapsed time measured in fractions of a second with the aid of the output signal from generator 6.

Unit 15A includes a memory 9 for storing the time preset by means of switches 33 in unit 1A. A detector 13, with inputs connected to memory 9 and counter 3, responds to a coincidence of the selected setting with the reading of the counter to actuate a driving circuit 14 for a speaker 15 so as to emit an audible alarm signal. The alarm condition may also be indicated by a flashing of the indicator elements in section 16 of unit 1A.

An antenna 17, designed to intercept electromagnetic waves originating at a remote station which may be common to a large number of such timepieces, works into a receiver 18 which, via a selection circuit including filters 19 and 20, energizes the driving circuit 14 of speaker 15 through an amplifier 22 in the presence of an incoming call signal. In accordance with our present invention, however, receiver 18 is normally deactivated by virtue of the fact that a connection 60, carrying an operating voltage $V_{DD}$ from power supply 60A, includes a gate 292 which is blocked in the absence of an activating signal from a timer 282 controlled by the frequency divider 2. This activating signal is generated only for a limited time interval, e.g. of 5 minutes, during a recurrence period of, say, 15 minutes, the time intervals being relatively staggered for different groups of pager watches served by the same central station. Thus, speaker 15 is externally operable only at certain times, along with the speakers of other watches in the same group but to the exclusion of those in other groups.

Unit 25A comprises a plurality of sensors 25, 26, 27 designed to detect certain abnormal ambient conditions, such as gas or radiation; they could also respond, for example, to the body temperature or the blood pressure of the wearer. Each generator works through a respective threshold gate 28, 29, 30 into a carrier-wave generator 31 whose output passes through a transmission circuit 40 into receiver 18 and thence to the speaker 15. Gates 28 – 30 are controlled by frequency divider 2 to give passage to the sensor outputs at suitable times.

A branch of the output circuit of receiver 18 also includes a filter 21, a gate 23 and a reset-signal generator 24 working into the counter 3. Thus, a synchronization signal received from the remote station and having a frequency designed to pass the filter 21, e.g. of 400 Hz, can be used to reset the counter 3 to zero.

Calculating unit 50A comprises a set of key switches 45 for the digits 0 – 9 and for the selection of mathematical operations to be performed, a memory 50 for the storage of numerical values, a sequence generator 52 for the various calculating steps, an arithmetic device 51, a decoder 53 and a coupling circuit 54 controlled by frequency divider 2. A memory 50 works into code converter 4 for enabling the result of the operation to be displayed by unit 1A.

Power supply 60A may be rechargeable from an external source by conventional means not shown.

We claim:

1. In a portable electronic timepiece, in combination: a crystal oscillator;

frequency-dividing means connected to said oscillator;
counting means stepped by said frequency-dividing means;
code-conversion means connected to said counting means for generating time-indicating signals;
electro-optical display means connected to said code-conversion means for energization by said time-indicating signals in a display recurrent cycle of at least 12 hours;
normally deactivated receiving means for external signals;
timing means controlled by said frequency-dividing means for periodically activating said receiving means several times during said display cycle for a limited time interval; and
sound-emitting means responsive to external call signals upon activation of said receiving means by said timing means.

2. The combination defined in claim 1, further comprising resetting means for said counting means responsive to an external synchronizing signal from said receiving means.

3. The combination defined in claim 1, further comprising sensing means connected by way of said receiving means to said sound-emitting means for operating same upon detecting an abnormal ambient condition.

* * * * *